Patented Apr. 19, 1938

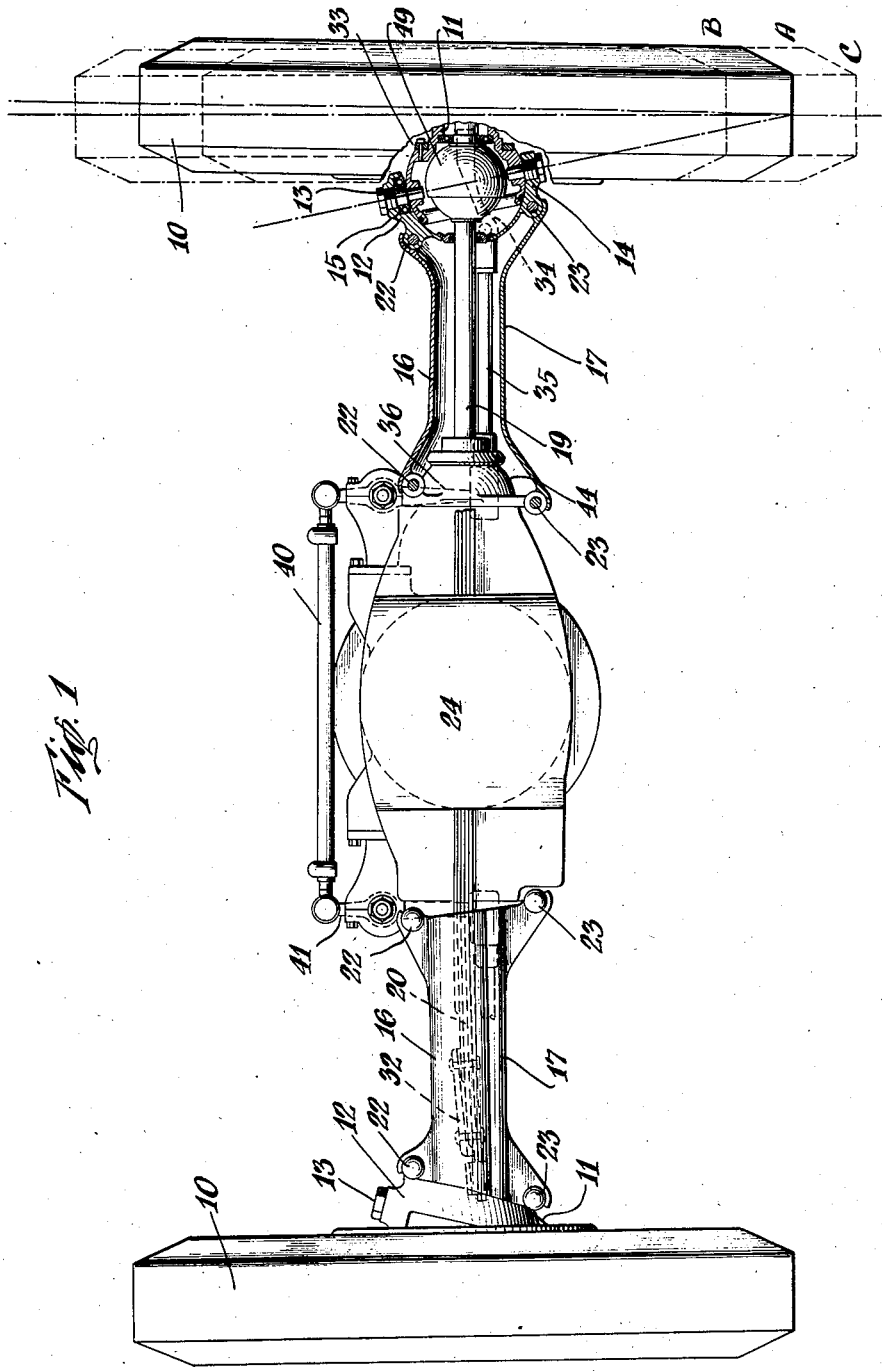

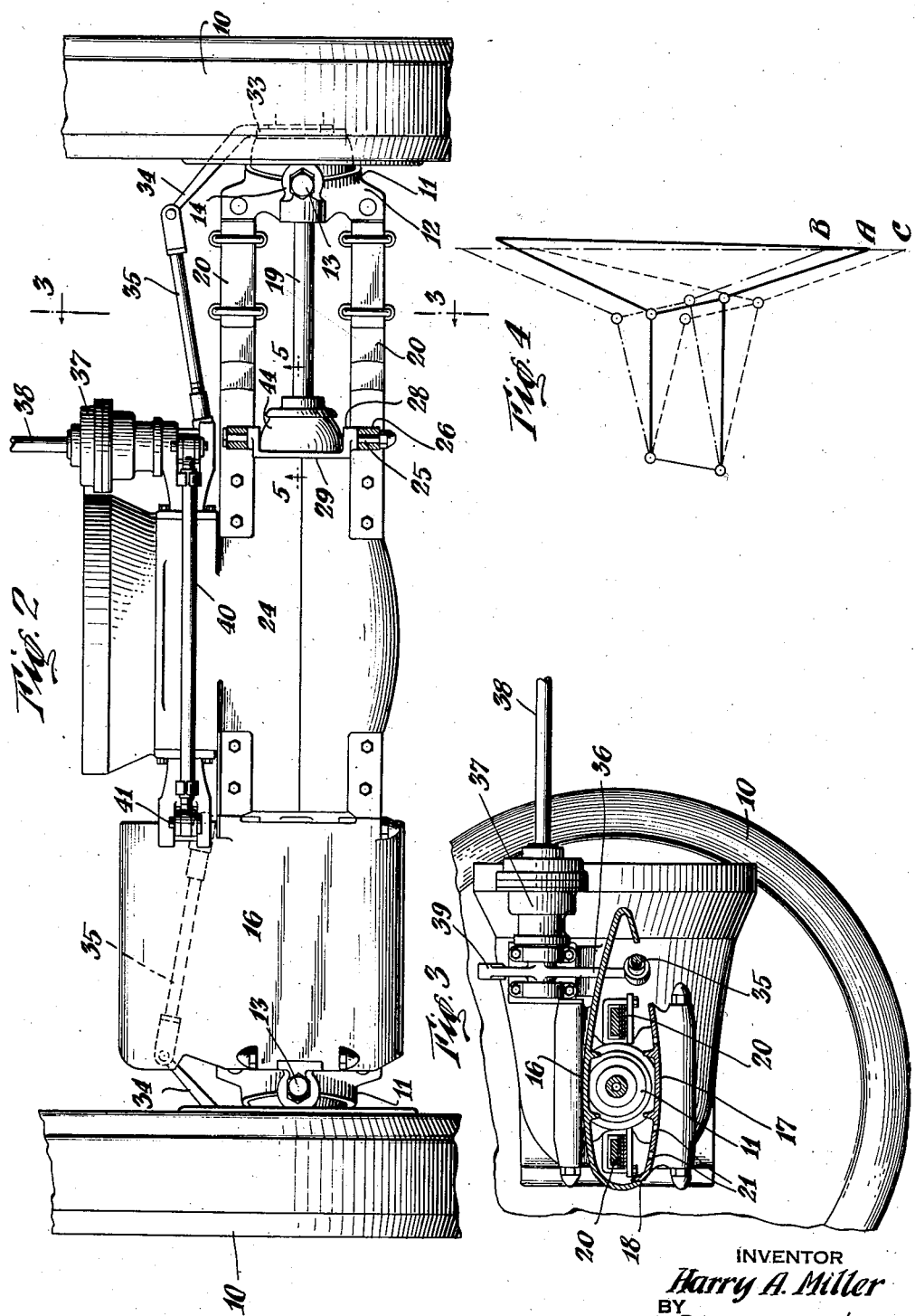

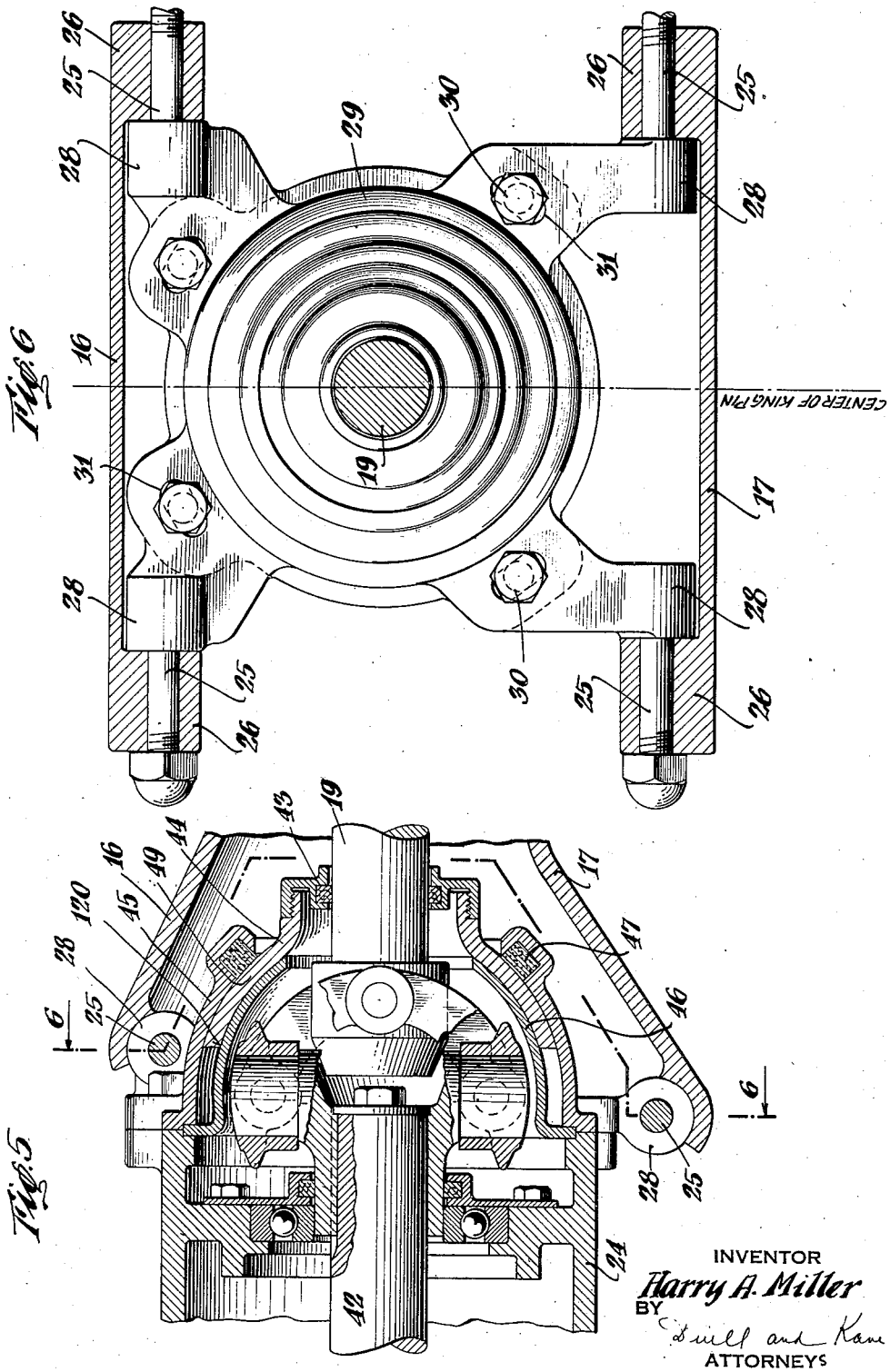

2,114,452

UNITED STATES PATENT OFFICE 2,114,452

WHEEL MOUNTING

Harry A. Miller, New York, N. Y., assignor to H. A. Miller Engineering Corporation, New York, N. Y., a corporation of New York Application April 26, 1935, Serial No. 18,322

2 Claims. (Cl. 280—124)

This invention relates to a functionally and structurally improved wheel suspension and steering gear capable of use in numerous different associations but primarily intended to be employed in connection with automotive vehicles.

It is an object of the invention to furnish an apparatus of this character in which a wheel may have free movement with respect to a road surface but in which such movement will not include factors detrimental to the tire mounted by the wheel or the periphery of the latter. As a consequence "tire scuffing" such as usually occurs in connection with so-called "knee action" mounting is reduced to a minimum, aside from the fact that the vehicle is more stable and will consequently be more fully under the control of the operator.

A further object of the invention is that of providing a mechanism whereby the foregoing result may be achieved and which mechanism may include a drive such that the wheel suspension or assembly may include one or more power axles. This will be particularly advantageous in the event that the automotive vehicle is to be of the front drive type and/or if an independent suspension of the rear wheels is to be resorted to.

An additional object is that of furnishing mechanism embodying one of more of the foregoing characteristics and which mechanism will embrace relatively few parts, each individually simple and rugged in construction and capable of quantity production and assemblage to furnish a unitary apparatus operating over long periods of time with freedom from difficulties.

With these and other objects in mind, reference is had to the attached sheets of drawings illustrating one practical embodiment of the invention and in which:

Fig. 1 is a partly sectional front view of a vehicle axle together with the mechanisms associated therewith;

Fig. 2 is a plan view of the apparatus as shown in Fig. 1 with a portion of the housing removed to disclose the underlying construction;

Fig. 3 is a transverse sectional view taken along the lines 3—3 and in the direction of the arrows as indicated in Fig. 2;

Fig. 4 shows diagrammatically the movements of certain of the parts as afore illustrated;

Fig. 5 is an enlarged sectional view taken along the lines 5—5 and in the direction of the arrows as indicated in Fig. 2, and Fig. 6 is a transverse sectional view taken along the lines 6—6 and in the direction of the arrows as indicated in Fig. 5.

Referring primarily to Figs. 1, 2 and 3, it will be noted that the reference numeral 10 indicates the tires of wheels, which wheels are mounted upon suitable bearings 11, in turn coupled to or mounted by housings 12 which may be generally spherical in outline. These housings are supported for rotation upon opposed pins 13 mounted by a bracket 14.

These pins serve the function of what are commonly known as king-pins, there being associated with the uppermost of the same an antifriction bearing 15 which will prevent binding of the parts. At this time it is to be observed that in accordance with conventional construction the wheels or tires 10 are normally "toed-in", or cambered and are inclined with respect to the vertical. However, additionally, according to the present invention the axes of the pins 13 are inclined so that the plane thereof will intersect the tread of the tire or wheel intermediate its side edges and adjacent its point of contact with the road surface; the purpose of this construction being hereinafter more particularly brought out.

Pivotally secured to each bracket 14 adjacent the upper and lower portions thereof are radius arms or elements 16 and 17. As especially shown in Fig. 3, these elements are preferably in the nature of shells which overlap as indicated at 18 and which, in aggregate, form a stream line section enclosing the power axle 19 (conceding that such axle is employed) as well as springs 20 which are preferably arranged in advance and to the rear of such axle or occupy corresponding positions within the enclosure thus provided. Additionally, the lowermost element is preferably formed with a series of openings 21 adjacent its leading as well as trailing edge so that as the vehicle moves there will be no danger of a suction effect occurring and which would tend to fill the enclosure with particles of foreign matter. The foregoing is a preferred type of construction. It is, of course, obvious that in lieu of these shell members simple radius elements might be substituted. But, in any event, it is preferred that the following construction be adopted:

As illustrated in Fig. 1 the upper element 16 should have its points of pivotal mounting 22 spaced inwardly from the points of pivotal mounting 23 of the member 17. In other words, the upper member in addition to being shorter than the lower member also has its body wholly disposed well within the zone of such lower member. As a consequence and referring especially to Figs. 1 and 4, it will be understood that as the periphery of the wheel—incident to striking any unevenness in the road surface or otherwise—moves from its normal position A to an upper position B, such peripheral surface will move inwardly to only a very minor extent. Likewise, as it rebounds from position B to position C the inward movement of the lower peripheral surface is practically infinitesimal. The upper peripheral portion of the wheel will, of course, have a decided deflection during such vertical movements but—not being in contact with the road surface—such movements will be immaterial in that they do not result in scuffing of the tire or in other detrimental actions. Thus, one of the main objections to independently sprung wheels is overcome in that the sidewise movement of such wheels, and which movement is incidental to their upward and downward movement, is avoided. Consequently, unnecessary tire wear will be reduced to a minimum.

The outer ends of springs 20 are, of course, secured to the bracket 14, such attachment being preferably in the plane of the axle 19 or an equivalent plane. The inner ends of the springs are secured to a housing 24 which may house a differential and other gearing (not shown). It is also to be understood that the inner points of pivotal mounting 22 and 23 are preferably arranged in planes substantially intersecting the main zone of flexure of the springs. Additionally, it is extremely desirable that the axes of the king pins 13 be capable of being shifted to assume a more or less inclined position with respect to the direction of travel of the vehicle over the road surface. With this in mind the inner points of pivotal attachment are preferably provided by bolts 25 which extend through lugs or bored portions 26 of the shell 16 and 17 and bear within projecting portions 28 of a spider or plate 29. The latter is secured to the housing 24 by means of a series of bolts 30, the shanks of which ride within arcuate slots 31 formed in the plate 29. Consequently, it is feasible for a mechanic to loosen the bolts 30 and to shift the entire plate 29 together with the points of pivotal mounting of the members 16 and 17 and until the king pin assembly and the springs occupy exactly the desired position. Thereupon the bolts 30 are again fastened. Of course, under these circumstances, it will be necessary for the operator to adjust the outer ends of these springs with respect to the bracket 12, this being accomplished by removing or adding suitable spring wedges 32 adjacent to the spring ends.

In this manner the caster of the axle or wheel mounting may be accurately adjusted to the individual peculiarities or requirements of the vehicle with which it is associated.

Suitably secured to or extending from a plate 33 associated with each of the housings or mounting members 12 is a steering arm 34 which has its inner end connected by means of a drag link 35 to a lever 36 extending from a steering gear housing 37. The mechanism within this housing may be of any desirable type and is preferably actuated by the rotation of a post 38. The lever 36 as shown in Fig. 3 is, of course, mounted for oscillation and may be continued in the form of an upwardly extending lever 39 having one end of a tie bar 40 coupled to it. The opposite end of this tie bar is connected to a similar lever 41, in turn coupled to units similar to those heretofore described. Of course but a single drive is provided for this mechanism. In other words, only a single steering post is preferably utilized but it will be apparent that within the construction specified a rocking of the lever 36 will result in a simultaneous shifting of the links 35 and the swinging of the wheels around the king pin assemblies to a greater or lesser extent. Also due to the angular arrangement of the drag link arm and the general set-up of the parts as heretofore described, it will be found that the inner wheel in such swinging movements will turn to a greater extent than the outer wheel of the vehicle as the latter is traversing the curve. In other words, one wheel will be "cramped" to a greater extent than the other wheel to allow for the fact that the former is traversing a circle of lesser radius than the latter. Accordingly, and by means of the present invention, unnecessary tire wear will again be reduced to a minimum.

As afore brought out, in the event that the present invention is to be employed in connection with a power axle or drive a shaft 19 is utilized. If this is the case driving force is transmitted to this shaft by having the inner end of the latter connected to any suitable type of universal 120. The universal is, of course, also connected to a drive shaft 42 within the housing 24 and at this time it will be noted that the inner points of pivotal mountings 22 and 23 in addition to intersecting the zone of flexure of the springs are also arranged to preferably intersect the operating plane of the universal. To prevent entrance of foreign matter into the mechanism it is preferred that the axle 19 be engaged by a packing member 43 secured to a shell 44. The latter may be of hemi-spherical contour and be slidably interposed between the surfaces of correspondingly shaped shells 45 and 46. Associated with at least one of these latter shells is a packing ring or gasket 47 and it will thus be obvious that while the axle or shaft may be free-swinging with respect to the driving axle 42, the parts will be adequately protected from the entrance of foreign materials.

It will be understood that the housings which have been generally indicated at 49 and which are associated with the outer ends of the shafts 19 house universals of any suitable type. When so employed it will be apparent in view of the fact that the wheel is in each instance mounted by a member such as 12 and moreover in view of the fact that the king pins engage this member and extend from the brackets 14, that the latter may swing under the guidance of the radius elements to maintain the body of the wheel in proper position under all conditions of drive as well as supporting surface.

From the foregoing it will be apparent that among others, the several objects of the invention as specifically aforenoted are achieved. Obviously, numerous changes in construction and re-arrangements of the parts might be resorted to without departing from the spirit of the invention as defined by the claims.

Having described my invention, what I claim as new and desire to secure by Letters Patent is:

1. An apparatus of the character described including, in combination, a mounting member, pairs of radius elements extending from such mounting member, the individual elements of each pair being arranged one above the other, means for pivotally connecting the inner ends of such elements with such mounting member, a pair of wheels, means for pivotally connecting such wheels with the outer ends of such pairs of radius elements, springs disposed within the space defined between said elements and connected to said mounting member and said wheels, and one of the radius elements of each pair being of less length than the other of the same, such radius elements comprising shell-shaped bodies having overlapping edge portions.

2. An apparatus of the character described including, in combination, a mounting member, pairs of radius elements extending from such mounting member, the individual elements of each pair being arranged one above the other, means for pivotally connecting the inner ends of such elements with such mounting member, a pair of wheels, means for pivotally connecting such wheels with the outer ends of such pairs of radius elements, springs disposed within the space defined between said elements and connected to said mounting member and said wheels, and one of the radius elements of each pair being of less length than the other of the same, such radius elements including shell-shaped bodies forming in aggregate a streamline section.

HARRY A. MILLER.